United States Patent
Steiger et al.

(10) Patent No.: US 9,208,555 B1
(45) Date of Patent: Dec. 8, 2015

(54) METHOD FOR INSPECTION OF ELECTRICAL EQUIPMENT

(71) Applicant: ABB Technology AG, Zürich (CH)

(72) Inventors: Olivier Steiger, Zürich (CH); Yannick Maret, Dättwil (CH)

(73) Assignee: ABB TECHNOLOGY AG, Zurich (CH)

( * ) Notice: Subject to any disclaimer, the term of this patent is extended or adjusted under 35 U.S.C. 154(b) by 21 days.

(21) Appl. No.: 14/304,545

(22) Filed: Jun. 13, 2014

(51) Int. Cl.
*G06K 9/00* (2006.01)
*G06T 7/00* (2006.01)
*G06F 17/30* (2006.01)

(52) U.S. Cl.
CPC .......... *G06T 7/001* (2013.01); *G06F 17/30268* (2013.01); *G06T 2207/10004* (2013.01)

(58) Field of Classification Search
CPC ............. B64C 2201/127; B64C 39/024; B64C 2201/027; B64C 2201/042; B64C 2201/108; B64D 31/06; B64D 47/08; G06T 7/00
USPC ......................................................... 382/141
See application file for complete search history.

(56) References Cited

U.S. PATENT DOCUMENTS

| | | | |
|---|---|---|---|
| 8,874,283 B1 * | 10/2014 | Cavote | B64D 47/08 701/11 |
| 2014/0207419 A1 * | 7/2014 | Messinger | G01N 27/90 703/1 |

* cited by examiner

*Primary Examiner* — Manuchehr Rahmjoo
(74) *Attorney, Agent, or Firm* — Buchanan Ingersoll & Rooney PC

(57) ABSTRACT

Exemplary methods for inspecting electrical equipment in a power distribution network can include the steps of recording, by a mobile device, a photograph with a view of the object, transmitting recording information of the mobile device and the photograph to a computer server hosting a power network description database; generating, from a model stored in the power network description database of a candidate object and based on the recording information of the mobile device, a representation of the candidate object, and comparing the transmitted photograph and the generated representation to identify and characterize the object in the photograph as the candidate object.

4 Claims, 2 Drawing Sheets

METHOD FOR INSPECTION OF ELECTRICAL EQUIPMENT

FIELD

The disclosure relates to the field of inspection of electrical equipment in a power transmission and distribution network, in particular, to localization, identification, characterization and damage assessment of electrical components such as transmission towers, power lines and transformers.

BACKGROUND INFORMATION

A power transmission and distribution network should be periodically inspected for existing or impending damage which may be caused by for instance storms, landslides, snow, or falling trees. Nowadays, these tasks can be routinely performed manually by on-site repair teams. Increasingly, utilities also rely on specialized companies such as Cyberhawk, Microdrones, Multirotor by service-drone, Aerial Photography Specialists, that perform inspection tasks using drones. However, the drones can be operated and navigated manually, and images produced by on-board video cameras can be inspected by humans. This makes the inspection of the electrical equipment in the power networks time- and cost-consuming.

The electrical utilities and other network operators normally have detailed knowledge of their installed equipment. In particular, they know where power lines, transmission towers/poles, transformers and other equipment is located. They also know the type, and therefore the geometry, of each piece of equipment. This information, e.g., exact location including orientation and the 3D model of each piece of equipment can be collected in a network description database maintained by the utility.

SUMMARY

An exemplary method of identifying and characterizing an object of a power network is disclosed, comprising: recording, by a mobile device, a photograph with a view of the object; transmitting recording information of the mobile device and the photograph to a computer server hosting a power network description database; generating, from a model stored in the power network description database of a candidate object and based on the recording information of the mobile device, a representation of the candidate object; and comparing the transmitted photograph and the generated representation to identify and characterize the object in the photograph as the candidate object.

An exemplary method of generating an image segment corresponding to an object of a power network is disclosed, comprising: recording, by a mobile device, a photograph with a view of the object; transmitting recording information of the mobile device to a computer server hosting a power network description database; generating, from a model stored in a power network description database of a candidate object and based on the recording information of the mobile device, candidate information including at least one of image coordinates and appearance of the candidate object within the photograph; generating, by the mobile device, the image segment for the object based on the candidate information.

An exemplary method of identifying and characterizing an object of a power network is disclosed, comprising: recording, by a mobile device, a photograph with a view of the object; transmitting recording information of the mobile device to a computer server hosting a power network description database; generating, from a model stored in the power network description database of a candidate object and based on the recording information of the mobile device, a representation of the candidate object; transmitting at least one of candidate information including image coordinates and appearance of the candidate object in the photograph to the mobile device; generating, by the mobile device and based on the candidate information, an image segment of the photograph; transmitting the image segment of the photograph to the computer server; and matching the image segment of the photograph with the generated representation to identify and characterize the object in the photograph as the candidate object.

BRIEF DESCRIPTION OF THE DRAWINGS

The subject matter of the disclosure will be explained in more detail in the following text with reference to preferred exemplary embodiments which can be illustrated in the attached drawings, in which.

The reference symbols used in the drawings, and their primary meanings, can be listed in summary form in the list of designations. In principle, identical parts can be provided with the same reference symbols in the figures.

DETAILED DESCRIPTION

Figure 1:
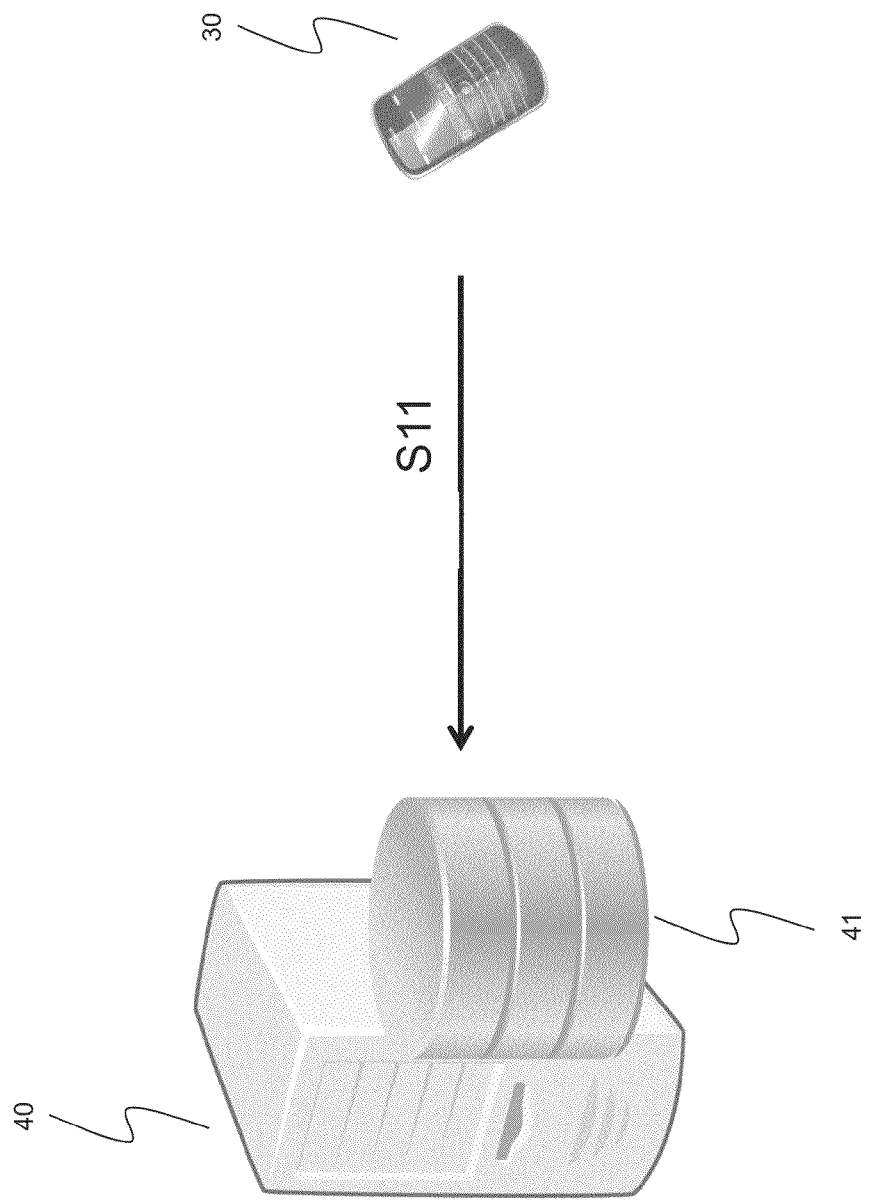
FIG. 1 schematically shows a first system where 3D images can be used for equipment localization and damage assessment according to an exemplary embodiment of the present disclosure.

Exemplary embodiments of the present disclosure provide a method of inspecting the electrical equipment in the power network that enables at least partially automatic inspection using the existing data collected in the network description database, in order to save response time and cost. The response time is saved when the repair team does not have to be dispatched to the damage site twice, e.g., first to assess the damage, then to repair it. That is a drone can be dispatched instead of the repair team for damage assessment.

Exemplary embodiments of the present disclosure use the existing knowledge of installed equipment in order to simplify and accelerate the process of image segmentation.

In order to automate power networks inspection, it is possible to rely on image processing/computer vision. One key yet difficult task is the localization, identification and damage assessment of electrical components such as transmission towers, power lines and transformers. This process can be aided by matching images and location data such as GPS from mobile inspection devices, for example, drone, camera cell phone, with component models and maps maintained by the electric utility. Exemplary embodiments of the present disclosure are directed to this matching process and its application to power networks inspection.

The present disclosure provides a exemplary method of identifying and characterizing an object of a power network, including the steps of: recording, by a camera of a mobile device, a photograph with a view of the object; transmitting recording information of the mobile device and the photograph to a computer server hosting a power network description database; generating, from a model stored in the power network description database of a candidate object and based on the recording information of the mobile device, a representation of the candidate object; and comparing the transmitted photograph and the generated representation to identify and characterize the object in the photograph as the candidate object.

The object to be identified may be a piece of electrical equipment of the power network, e.g., transformers, breakers or power lines. The power network can be also called power distribution network or power transmission network.

The mobile device may be a camera, smartphone with camera, a tablet computer with camera or a camera mounted on a UAV drone. The mobile device is provided with GPS and compass, such as also gyroscope. The photograph made by the mobile device may be a 2D or 3D picture that represents the object in at least one view direction. The coordinates determined by the mobile device at the time of recording the photograph may include device location information such as geographic coordinates and viewing direction.

The recording information can be metadata indicating the camera coordinates. The camera coordinates can be orientation and viewing direction of the camera when taking the photograph. The camera coordinates indicate the geographical coordinates that may be obtained by the GPS or accelerometer of the mobile deice. The camera orientation, e.g., tilt, angle, is measured by gyroscopes, compass. This gives the viewing direction, e.g., the part of the real-world scene that is actually "seen" by the camera. Further the recording information may include optional camera parameters such as focal length, image format, principal point, lens distortions, or other information as desired. The camera parameters can be often useful to refine the expected appearance of the photographed object.

The computer server runs the network description database. The computer server is usually maintained by the power utility and run inside of the power network. However, it is possible that the server is located at places outside of the power network, e.g., external contractor or even on the mobile device itself. The network description database is the database that stores the network map or topology, e.g., information about the geographical location of each piece of equipment. The database further contains 3D models of the different pieces of equipment.

The term identify means determining the presence or type of equipment, e.g., "this is a transformer", while "characterize" relates to determine the condition of equipment, e.g., the transformer is damaged.

The representation, e.g., image in a broader sense, of the candidate object being generated from the model and matched with the photograph taken by the mobile device is usually not an actual view of the electrical equipment. In general, a synthetic 3D model of the equipment is stored in the database instead of an actual picture. In principle, it is also possible to store many different images of the same equipment, acquired under different perspectives, illumination conditions, etc. The set of all images does then constitute the model of that equipment. The representation includes characteristic information, e.g., representative vectors, morphologic skeletons, colour histograms. This kind of information can be extracted from both the transmitted photograph and the model stored in the power network description database. The step of comparison means matching of the photograph transmitted by the mobile device with the generated representation, using their characteristic information.

According to another exemplary embodiment of the present disclosure, a method of generating an image segment corresponding to an object of a power network is provided, comprising steps of: recording, by a mobile device, a photograph with a view of the object; transmitting recording information of the mobile device to a computer server hosting a power network description database; generating, from a model stored in a power network description database of a candidate object and based on the recording information of the mobile device, candidate information including image coordinates and/or appearance of the candidate object within the photograph, and generating, by a mobile device, the image segment for the object based on the candidate information.

Another exemplary embodiment of the present disclosure provides a method of identifying and characterizing an object of a power network, comprising: recording, by a mobile device, a photograph with a view of the object; transmitting recording information of the mobile device to a computer server hosting a power network description database; generating, from a model stored in the power network description database of a candidate object and based on the recording information of the mobile device, a representation of the candidate object; transmitting candidate information including image coordinates and/or appearance of the candidate object in the photograph to the mobile device; generating, by the mobile device and based on the candidate information, an image segment of the photograph; transmitting the image segment of the photograph to the computer server; and matching the image segment of the photograph with the generated representation to identify and characterize the object in the photograph as the candidate object.

This approach reduces the amount of data to be transmitted and decreases the transmission time. Alternatively, the image segments can be generated on the server at the utility location, which reduces the computational load of the mobile device in case the mobile device is not equipped with a powerful CPU that can handle the image segmentation process. In this case, the mobile device needs not be provided with an image processing program for the segmentation process.

In general, the image segments of the photograph can be created by image processing techniques. The process of image segmentation partitions a digital image into multiple segments, e.g., sets of pixels. The image segmentation simplifies the representation of the image and can be used to locate objects and boundaries in image. This is easier if the location of the object in the photograph is known a-priori. The image segmentation is less complex and contains fewer amounts of data, e.g., only contains the bounding box, or contains more accurate shapes such as polygons or contours, also without background. Thus, transmitting the image segments instead the image itself reduces the amount of data to be transmitted.

The image segmentation can be used for identification of candidate objects in the photograph. This is the process of determining the location of interesting objects, e.g., power equipment, in an image. Their location can be determined approximately, e.g., by a rectangular area that is a bounding box. It can also be determined precisely at the pixel level.

The appearance of an object is the way the object looks in the image. This depends on camera parameters and viewing direction, scene illumination, atmospheric properties such as fog, etc. The representation of the object is the mathematical description of the object, as numbers or vectors. In the simplest case, the representation is given by the collection of pixels that constitute the object. More often, features can be used that capture the salient properties of an object, e.g., shape, colour, and that can be in with respect to illumination, object position & orientation etc. Examples include object edges, morphological skeleton, colour histograms.

The image coordinates of the candidate object can be determined based on the model stored in the power network description database of the candidate object and the recording information. The image coordinates indicates the location of the object in the image, e.g., where the object is located on camera. This location information provides the information, e.g. the object is located at image coordinates x=[200:300], y=[180:250]. This is of course different from the absolute geographical location in latitude and longitude, which can be obtained by the GPS of the mobile device and which is also stored in the network description database for each object.

In an exemplary embodiment of the present disclosure, the method further includes the steps of: identifying a difference between the generated representation and the transmitted photograph; and concluding, based on the identified difference, on the object being damaged. In order to conclude if the object is damaged, methods based on object representations such as morphological skeletons can be used.

According to another exemplary embodiment, the present disclosure provides a method of characterizing an object of a power network, comprising the steps of recording, of a mobile device, a photograph of the power network; transmitting recording information of the mobile device and the photograph to a computer server; generating, from a model of a candidate object and based on the coordinates of the mobile device, a representation of the candidate object; comparing the transmitted photograph and the generated representation; and characterizing, in case of no match, the candidate object as being heavily damaged.

The present disclosure allows at least partially automatic drone navigation and power networks monitoring. This is achieved by matching images—captured for instance by on-board video cameras or customer cell phones—with maps & 3D models of the power network. In particular, the electrical components can be localized by matching components that can be visible in captured images with their counterparts in the network map and consisting of matching photographed components with the 3D model of the intact component.

Automating power networks inspection according to the present disclosure brings benefits both in terms of response time and cost. In fact, dispatching drones or nearby customers to the inspection site may be considerably faster than sending out repair teams with limited personnel. Also the size of repair teams can be lowered.

The present disclosure also relates to a computer program product including computer program code for automatic inspection of the electrical equipment in the power networks, particularly, a computer program product including a computer readable medium containing therein the computer program code.

FIG. 1 schematically shows a first system where 3D images can be used for equipment localization and damage assessment according to an exemplary embodiment of the present disclosure. In particular, the exemplary embodiment as described can determine what exact piece of equipment is seen in the photograph, e.g., localization of the equipment. Moreover, the differences between expected image, e.g., from the database and camera coordinates, and the actual image photographed by the mobile device can be found, in order to determine damages of the equipment.

The information stored in the network description database can further be exploited to support image-processing operations run on a remote terminal such as a smart camera, cell phone, tablet computer or drone. More specifically, equipment location and geometry can be matched with the images and coordinates collected by the remote terminal. The coordinates can be gathered from GPS and accelerometers indicating viewing angle or direction. This allows one to precisely localize specific equipment in the image. It also enables one to determine damage by finding differences between the expected image and the actual image produced by the camera. The expected image can be calculated from database models and camera coordinates.

In particular, the mobile device 30 can be provided with accelerometers, GPS and camera. For example, in an exemplary embodiment, the mobile device 30 can be provided with other useful sensors such as gyroscopes and compass/magnetometers for the determination of the camera's viewing direction. A service personal or the drone can make a photograph of the electrical equipment using the camera of the mobile device, and send the photograph and the camera coordinates to the electric utility, step S10. The photograph may include multiple views in different viewing direction and the camera coordinates can be determined using the GPS and/or accelerometers of the mobile device 30. A computer server 40 receives the photograph and matches the photograph with a representation generated from the 3D model of the equipment. The 3D model is included in the network map in a network description database 41.

The matching process, e.g., matching the camera coordinates and photographed 3D image of the electrical equipment with the database model, any difference, if it exists, can be identified. Based on the difference, the server can conclude if the electrical equipment is damaged. For instance, if the difference exceeds a predefined threshold, it is an indication that the electrical equipment is damaged.

If the difference is very small or does not even exists, it may mean that the equipment is in good condition and the difference is caused by image noise and differences in acquisition conditions, e.g., illumination changes, weather and ageing, but still within the tolerance range.

In case of no match of the photograph with the representation from 3D model database at all, it can be concluded that the equipment is heavily damaged, e.g., inoperable, exploded or stolen.

In case the quality of the photograph is below a certain level, the server may inform the service personal or the drone to send a new photograph of the electric equipment.

Figure 2:
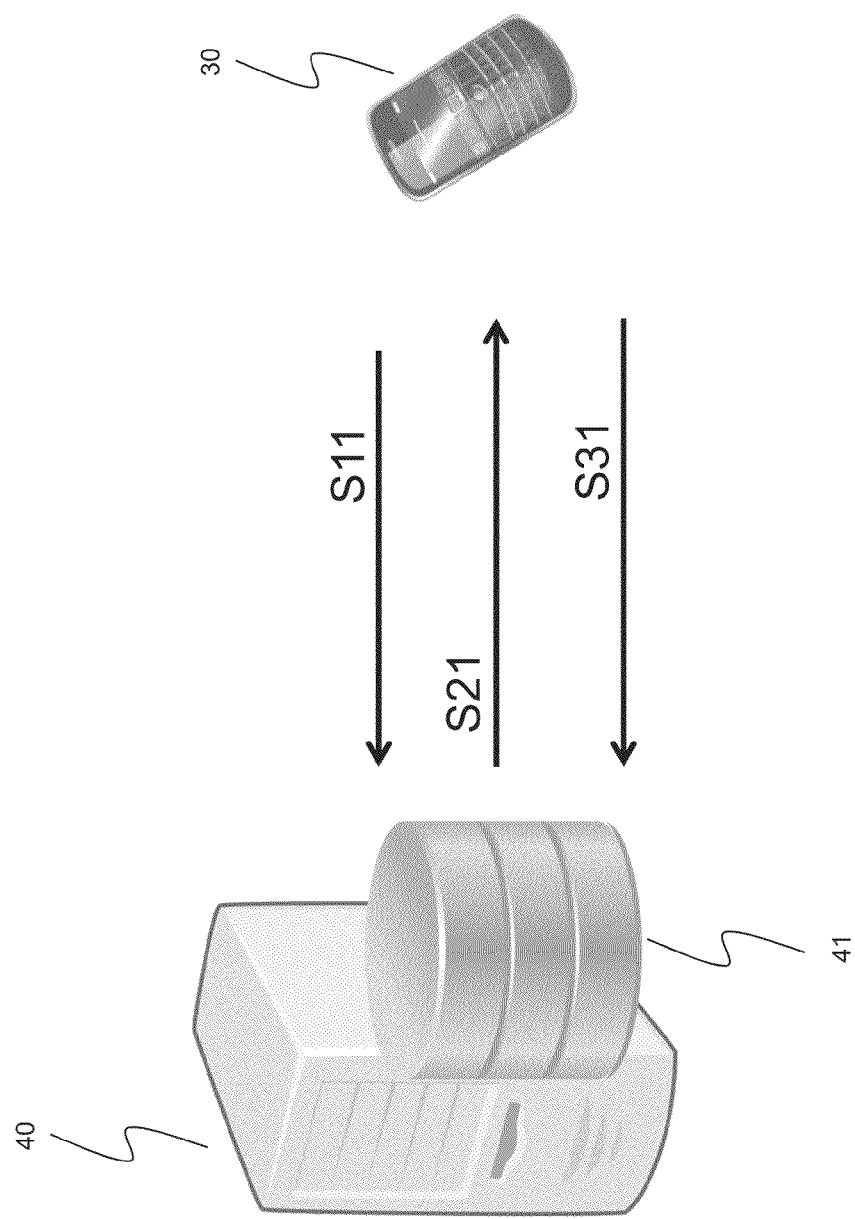
FIG. 2 schematically shows a second system where 2D images can be used to assist image segmentation according to an exemplary embodiment of the present disclosure.

FIG. 2 schematically shows a second system where 2D images can be used to assist image segmentation according to an exemplary embodiment of the present disclosure. In particular, image segmentation at the mobile device is used for object localization, which saves bandwidth by transmitting only the relevant image segment. In this usage, the server 40 predicts the location and appearance of electrical equipment in the images shot by the camera. It does so by calculating the expected appearance of the equipment from camera coordinates—which describe the scene geometry—and from 3D models of the electrical equipment. The camera then uses this information to segment the image, e.g., localize equipment in the acquired image based on further camera parameters such as magnification and resolution. The computationally expensive image recognition task is still performed at the server.

In particular, the server 40 receives the camera coordinates from the GPS and accelerometers of the mobile device, step S11. Upon receiving the coordinates, the server 40 predicts and sends the information on exact location and appearance of the equipment in the photograph shot by the camera of the mobile device, step S21. Based on this information, the mobile device segments the photograph around presumed equipment location and sends only the image segment to the server, step 31. The matching process can be the same as described for the exemplary usage of FIG. 1.

In summary, the exemplary usage illustrated in FIG. 1 relates to determination of the nature and condition of power equipment. This can be achieved by comparing the actual appearance of some power equipment—as produced by the camera of a mobile device—with the expected appearance of the same equipment—as obtained from 3D models stored in the network description database and rendered for given camera coordinates and viewing direction. The similarity between the actual and the expected appearance allows one to determine the nature and condition of the photographed equipment. The exemplary usage illustrated in FIG. 2 describes an improved image segmentation process using the location information. The image segmentation is the process of determining the location of interesting objects in an image. Here, the approximate location is predicted from the camera position & viewing direction (known from the camera's GPS, accelerometers, gyroscopes and compass) and from the location of power equipment (known from the network description database). Then, the location may be further refined by image processing.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of identifying and characterizing an object of a power network, comprising:

recording, by a mobile device, a photograph with a view of the object;

transmitting recording information of the mobile device to a computer server hosting a power network description database;

generating, from a model stored in the power network description database of a candidate object and based on the recording information of the mobile device, a representation of the candidate object;

transmitting at least one of candidate information including image coordinates and appearance of the candidate object in the photograph to the mobile device;

generating, by the mobile device and based on the candidate information, an image segment of the photograph;

transmitting the image segment of the photograph to the computer server; and matching the image segment of the photograph with the generated representation to identify and characterize the object in the photograph as the candidate object, wherein the recording information indicates camera coordinates that comprise geographical coordinates and viewing direction of the camera when taking the photograph.

2. The method according to claim 1, comprising:

identifying a difference between the generated representation and the transmitted photograph;

concluding, based on the identified difference, whether the object is damaged.

3. The method according to claim 1, wherein the image coordinates of the candidate object are determined based on the model stored in the power network description database of the candidate object and the recording information.

4. The method according to claim 1, wherein the model stored in the network power network description database includes geographical coordinates of the candidate object.

* * * * *